United States Patent [19]

Ryu

[11] 4,453,256
[45] Jun. 5, 1984

[54] ADAPTIVE EQUALIZER SYSTEM FOR QUADRATURE AMPLITUDE MODULATION

[75] Inventor: Toshihiko Ryu, Tokyo, Japan

[73] Assignee: Nippon Electric Co., Ltd., Tokyo, Japan

[21] Appl. No.: 333,503

[22] Filed: Dec. 22, 1981

[30] Foreign Application Priority Data

Dec. 26, 1980 [JP] Japan ................................ 55-185609

[51] Int. Cl.³ ............................................. H04B 3/18
[52] U.S. Cl. ..................................... 375/15; 375/106
[58] Field of Search ............... 178/69 R, 69 M, 69 B, 178/63 E; 333/18; 375/12, 14, 15, 16, 106

[56] References Cited

U.S. PATENT DOCUMENTS

| | | | |
|---|---|---|---|
| 3,990,010 | 11/1976 | Bennett | 375/16 |
| 4,146,840 | 3/1979 | McRae et al. | 375/12 |
| 4,180,705 | 12/1979 | Guidoux et al. | 375/14 |
| 4,343,041 | 8/1982 | Forney, Jr. | 375/14 |
| 4,355,397 | 10/1982 | Stuart | 375/39 |

Primary Examiner—Benedict V. Safourek
Attorney, Agent, or Firm—Sughrue, Mion, Zinn, Macpeak and Seas

[57] ABSTRACT

An adaptive equalizer system for quadrature amplitude modulated waves is disclosed herein. The equalizer system comprises a circuit for equalizing the received signal as a function of a composite control signal; a circuit for generating a first control signal as a function of the deviation of the equalized signal from a zero-forced waveform; a circuit for generating a second control signal as a function of the asynchronization of the equalizer system; and an output circuit for processing both of said first control signal and said second control signal, producing the composite control signal which controls the equalizing means of the equalizer system.

7 Claims, 7 Drawing Figures

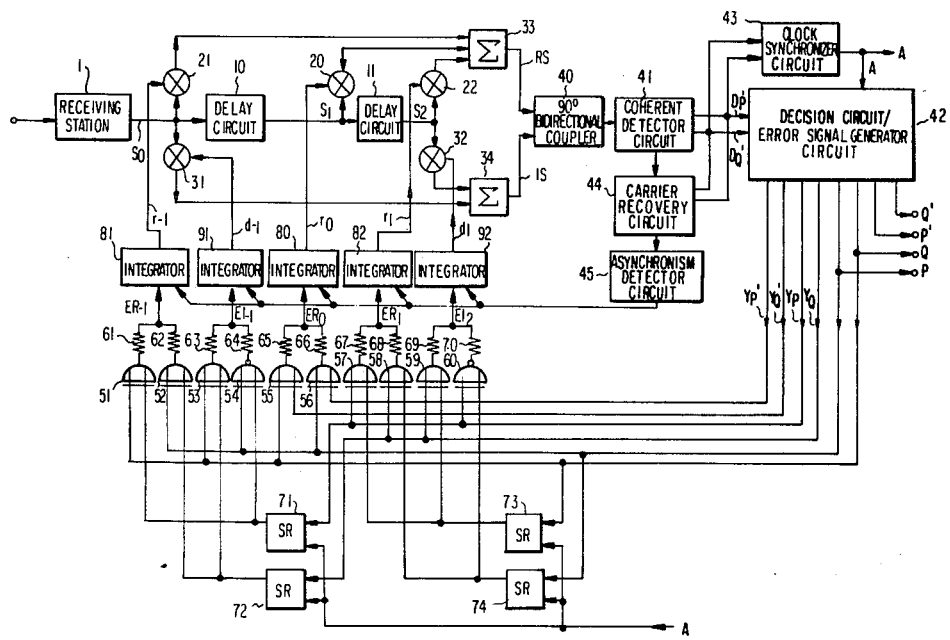

ADAPTIVE EQUALIZER SYSTEM FOR QUADRATURE AMPLITUDE MODULATION

BACKGROUND OF THE INVENTION

The present invention relates generally to an adaptive equalizer system and, more particularly, to an adaptive equalizer system for quadrature amplitudemodulated (QAM) waves for use in a digital radio transmission system.

A digital radio transmission system is typically susceptible to channel deterioration or momentary disconnection due to waveform distortion via multipath fading or the like occurring on the transmission path. These deficiencies can be surmounted by the use of an adaptive equalizer (hereinafter referred to as an equalizer) such as a transversal equalizer or a decision-feedback equalizer.

The first requirement for effective equalizer operation stems from the need, when the tap coefficient control loop (hereinafter referred to as the control loop) becomes asynchronized, for setting value of the variable tap coefficient control at an initial level such that this asynchronization can be eliminated. This action is commonly referred to as resetting. The resetting function improves the synchronizing performance of the equalizer and thereby maintains a stable synchronous state. A know method of realizing this resetting function is by providing an output of a voltage generator at the variable tap gain circuit of each tap in response to a signal of frame asynchronization or the like. For details on this method, reference is made to Japanese Patent Application Disclosure No. 49-2416 (or the corresponding West German Pat. No. 2,319,807. This method presents the disadvantage of requiring, apart from the equalizer, the power voltage generator for setting initial level as well as a relay for switching connections.

The second requirement for efficient equalizer operation, relative complexity or simplicity of structure, largely depends on the equalizing algorithm for the equalizer as well as the arrangement of the transversal filter section of the equalizer in the intermediate frequency (IF) band or in the baseband.

Equalizing algorithms involving relatively simplified circuitry, and as conventionally used in such equalizer applications, include the zero forcing (ZF)method and the modified zero forcing (MZF) method. Both methods, employing digital signal processing techniques, can be readily realized by using such simple circuits as logic circuits or shift registers. For details on these techniques, reference is made to D. Hirsch, "A Simple Adaptive Equalizer for Efficient Data Transmission", IEEE TRANSACTIONS ON COMMUNICATION TECHNOLOGY, Vol. COM-18, No. 1, pp. 5-12, February 1970.

Regarding the operational frequency band of the transversal filter section, since the input signals are quadrature amplitude-modulated waves, a transversal filter arranged in the IF band presents the advantage of containing the orthogonal and quadrature components of the modulated wave in a single signal. By such an arrangement no more than $2N_1$ variable attenuator circuits for providing variable tap coefficients are needed (the number of taps being represented by $N_1$, a positive integer). A transversal filter in the baseband, on the other hand, would require $2N_2$ to $4N_2$ variable attenuator circuits for processing the orthogonal component of the input signal, ($N_2$, a positive integer, representing the number of taps) thus involving complicated circuitry and corresponding is troublesome adjustment capabilities.

The simply structured transversal filter in the IF band, where the input carrier frequency is equal to an integral multiple of the modulation rate, readily permits the usage of a 2F equalizing algorithm. The number of phase rotations against the carrier wave in the signal delay circuit, which is selected to be equal to the inverse number of the modulation rate, is equal to an integral multiple of $2\pi$ as are phase differences between the taps. However, when the input carrier frequency is unequal to any integral multiple of the modulation rate, phase differences between the taps are unequal and accordingly the filter is rendered incapable of utilizing the 2F algorithm.

SUMMARY OF THE INVENTION

An object of the present invention therefore is to provide an adaptive equalizer system for QAM waves, which is highly stable and yet is simple in structure.

Features of the equalizer as according to the present invention are as follows:

(1) The initial level setting means is relatively simplified in structure since the control signal generating circuit inclues a self-feedback control loop, as described hereinafter;

(2) The delay time of the signal delay circuit of the IF band transversal filter either is the inverse of the modulation rate or the inverse of twice the modulation rate, such that the ZF method can be used by selecting the signal polarity in the control loop. This in turn controls the variable tap gain circuit for each tap, according to the phase difference of the carrier berween taps and, in the event of a frequency offset of the carrier, the quantity of phase shift; and (3) Instead of resorting to the known method of selecting the delay time of the signal delay circuit of the IF band transversal filter to be equal to the inverse number of the modulation rate of QAM waves, the IF band transversal filter, even if a frequency offset occurs to the carrier wave, control utilizing the ZF algorithm by selecting said delay time to be as close as practicable to the inverse of the modulation rate, under a condition where the carrier waves at the taps take on a specific phase relationship.

BRIEF DESCRIPTION OF THE DRAWINGS

Other features and advantages of the present invention will be more apparent from the detailed description hereunder taken in conjunction with the accompanying drawings, wherein:

FIG. 1 illustrates an embodiment of a three-tapped equalizer according to the invention, having an IF band transversal filter using the ZF method;

FIG. 2 shows one embodiment of the integrator with resetting function as referred to in FIG. 1;

FIG. 3 depicts one embodiment of the decision/error signal generator circuit, where L equals 16, as referred to in FIG. 1;

FIGS. 4, 5(a) and 5(b) are diagrams of the demodulated signal waveform and threshold levels for explaining the error signal generating method of prior art when L equals 16, and FIG. 6 is a vector diagram of IF signals.

DESCRIPTION OF THE PREFERRED EMBODIMENT

The embodiment of the invention illustrated in FIG. 1 is a three-tapped equalizer with an IF band transversal filter, having 16 QAM waves as its input. The description hereunder generally applies to any value of L ($L=l^2$, l being an integer not smaller than 2) and to an N-tapped (N being a positive integer) equalizer with an IF band transversal filter.

A radio signal is picked by an antenna (not shown) and fed to a receiving section 1. The IF signal $S_0$ from the receiving section 1 is delayed by a delay circuit 10 to provide a signal $S_1$, and further delayed by a delay circuit 11 to provide a signal $S_2$. The signal $S_0$ is branched, and multiplied in variable tap gain circuits 21 and 31 respectively by control signals $\gamma_{-1}$ and $d_{-1}$ from integrator circuits with resetting function 81 and 91. The signal $S_2$ is also branched, and multiplied in variable tap gain circuits 22 and 32 respectively by control signals $\gamma_1$ and $d_1$ from integrator circuits with resetting function 82 and 92. The signal $S_1$, is multiplied in a variable tap gain circuit 20 by a control signal $\gamma_0$ from an integrator circuit with resetting function 80. The output signals of the variable tap gain circuits 20, 21 and 22 are summed by a signal summing circuit 33 into a signal RS. On the other hand, the output signals of the variable tap gain circuits 31 and 32 are synthesized by a signal summing circuit 34 into a signal IS. The signals RS and IS are combined by a 90°-directional coupler 40 such that their phases are at a 90° angle to each other, and the composite signal is then fed to a coherent detector circuit 41, which receives a recovered carrier from a carrier recovery circuit 44 and detects the input modulated carrier wave thereby to generate two trains of baseband signals $D_P'$ and $D_Q'$. Many methods for carrier recovery are known in the art, such as the baseband processing technique disclosed in U.S. Pat. No. 3,983,499, and the present invention can use this or any other such recovery method.

An asynchronism detector circuit 45, as referred to in FIG. 1, uses a circuit for detecting asynchronism in the carrier recovery loop. Such circuits are disclosed in, among others, Japanese Patent Publication No. 55-34619 and U.S. Pat. No. 4,121,166. Another conceivable method of asynchronism detection is monitoring the bit error rate and, when it surpasses a prescribed level, imposing the initial level resetting, as in U.S. Pat. No. 3,721,959.

The decision/error signal generator circuit 42 (to be further described in detail with reference to FIG. 3) monitors the two trains of demodulated (quadrinary) baseband signals $D_P'$ and $D_Q'$ and, by detecting the deviation between the baseband signals and any one of four preset levels, supplies error signals $Y_P'$ and $Y_Q'$ for the control of the main tap and error signals $Y_P$ and $Y_Q$ which in turn control the other taps, corresponding to different distortions. The ZF algorithm corrects each tap coefficient $C_{jk}$ by the use of these error signals, in accordance with the steepest descent method practicable, to minimize the cusp or peak levels of waveform distortions, the expressions below, in which all variables (except $\Delta$) are given in (two-dimensional) complex numbers, are known with respect to the ZF algorithm.

$$C_{j(k+1)} = C_{jk} - \Delta \cdot sgn \sum_{k=1}^{K} D^*_{(k-j)} \cdot Y_k \quad 1)$$

$$C_{jk} = \gamma_{jk} + id_{jk} \quad 2)$$

$$Y_k = Y_{Pk} + iY_{Qk} \quad 3)$$

$$D^*_{(k-j)} = D'_{P(k-j)} - iD'_{Q(k-j)} \quad 4)$$

where
j is the tap number,
k is the time,
$\Delta$ is the fixed incremental step size of the tap setting,
$D^*_{(k-j)}$ is the complex conjugate of $D'_{(k-j)}$, and sgn is the polarity.

To rearrange the real and imaginary number parts, supposing $K=1$ which is usually used in actual circuits, the following expression hold:

$$\gamma_{j(k+1)} = \gamma_{jk} - \Delta \cdot sgn(Y_{Pk} \cdot D'_{P(k-j)} + Y_{Qk} \cdot D'_{Q(k-j)}) \quad 5)$$

$$d_{j(k+1)} = d_{jk} - \Delta \cdot sgn(Y_{Qk} \cdot D'_{P(k-j)} - Y_{Pk} \cdot D'_{Q(k-j)}) \quad 6)$$

Where the ZF method is used, all the variables in these equations are binary, and can be readily subjected to logical operation by a digital circuit. Products and sums are achieved by exclusive OR circuits (EORs) 51-53 and 55-59, exclusive NOR circuits (ENORs) 54 and 60, and resistors 61-70, respectively. The successive correction of taps in Equations (5) and (6) can be readily realized by the use of the integrators with resetting function 80, 81, 82, 91 and 92 (to be further described in detail below). Supposing here, with a view to explaining the control signals of FIG. 1, that $j=1$ (tap 1) and, to fix the time, $k=0$, thereby omitting k, the second term of the right side of Equations (5) and (6) will be transformed into, respectively:

$$\Delta \cdot \{Y_P D'_{P(-1)} + Y_Q D'_{Q(-1)}\} \quad 7)$$

$$\Delta \cdot \{Y_Q D'_{P(-1)} - Y_P D'_{Q(-1)}\} \quad 8)$$

The symbol sgn in Equations (5) and (6) is unnecessary, under the condition that the binary variables are logic operated. Here $D'_{P(-1)}$ and $D'_{Q(-1)}$ can be readily derived which correspond to signals "one bit" behind $D'_P$ and $D'_Q$. By the use of shift registers 73 and 74, and EROs 57-59 and ENOR 60, multiplication can be achieved as above stated. In the case of $j=1$, and where $D'_P$ and $D'_Q$ cannot be advanced by one bit, $Y'_P$ and $Y'_Q$ are delayed by one bit so that $D'_P$ and $D'_Q$ are in effect advanced one bit with respect to $Y_P$ and $Y_Q$. The above described multiplication can be likewise achieved by shift registers 71 and 72, EORs 51-53, and ENOR 54. The equalizer correlates error signals ($Y'_P$, $Y'_Q$) and demodulation signals ($D'_P$, $D'_Q$) by the given relationship with respect to time, determines the time position of the occurrence of an inter-symbol interference (waveform distortion), and eliminates this waveform distortion by controlling the variable tap gain circuit at the corresponding tap. Since waveform distortions include in-phase and quadrature distortions, the variable tap gain circuits 20-22 and 31-32 are needed to equalize the two types of distortion and the respective signals then have to be combined by the use of the 90° coupler. Whereas there is no variable tap gain circuit for quadrature distortion corresponding to the circuit 20 (in the way the variable tap gain circuits 31 and 32 correspond to the circuits 21 and 22, respectively) such a circuit may be added or the carrier recovery circuit 44 can be caused to perform the quadrature distortion elimination function. A clock pulse from a clock synchronizer circuit 43 is supplied to the decision/error signal generator circuit 42 and the shift registers 71–74 to generally synchronize the system.

The resetting function of the integrator will now be described in greater detail with reference to in FIG. 2. In the absence of distortion on the transmission path, the gain of each tap is:

$$\gamma_0 = 1, \gamma_{-1} = \gamma_1 = d_{-1} = d_1 = 0$$

When a distortion on the transmission path grows beyond the capability of the equalizer, the equalizer goes out of synchronization, and once it does so, gains $\gamma_{-1}$, $\gamma_1$, $d_{-1}$ and $d_1$ become unequal to zero such that a distortion occurs within the equalizer since the equalizer independently return to a state of synchronism. A resetting function is used to forcibly re-create the state of $\gamma_0 = 1$, $\gamma_{-1} = \gamma_1 = d_{-1} = d_1 = 0$, or to temporarily suspend the equalizing function. When the distortion on the transmission path is reduced to the point where it is within the pull-in or capture range of the equalizer, the resetting is released and the equalizer resumes its normal equalizing action. In other words, the resetting is intended to the variable tap gain circuits 21–22 and 31–32 at their respective initial levels and insure locked-in operation. When the resetting function is to be used, it is therefore desirable to forcibly set the output of the integrator at a certain voltage and to discharge the capacitor of the integrator.

Referring to FIG. 2, when the resetting signal from an asynchronism detector circuit 45 is "1" or in a state of synchronism, AND/NAND gate 111 opens an AND gate 112, so that input signal $ER_{-1}$, $EI_{-1}$, $ER_0$, $ER_1$ or $EI_1$ is fed to the input of an integrator 120 by way of AND gate 112 and an OR gate 114, for normal integrating operation. The integrator circuit 120 consists of a differential amplifier 121, resistors 122 and 123, a capacitor 124 and an offset adjusting power source 125. When the resetting signal is "0" or in a state of asynchronism, the AND/NAND gate 111 opens an AND gate 113, such that the output $V_0$ of the integrator 120 is negatively fed back to the input of the integrator 120 by way of the gates 113 and 114 and, while discharging the capacitor 124, simultaneously fixed to the threshold level of the input to the gate 113. A level shift circuit 130, which is provided to output the difference ($V_1-V_0$) between the gate input threshold and the tap gain voltage of each tap, is further provided although not absolutely required.

In a conventional equalizer with an IF transversal filter, the ZF algorithm is generally inapplicable for demodulated baseband signals ($D'_P$, $D'_Q$) and error signal ($Y_P$, $Y_Q$, $Y'_P$, $Y'_Q$) derived therefrom. Specifically, the algorithm can only be used when the carrier frequency ($f_c$) of input modulated signals is equal to a positive integral multiple of the modulation rate ($f_s$) of the input modulated signals. In the present invention, the phase rotations of the carrier, as produced by the delay times $\tau_1$ and $\tau_2$ in the delay circuits 10 and 11, are equal to the integral multiples of $2\pi$ and the modulated signals ($S_0$, $S_1$, $S_2$), such that all the taps are in phase with one another. However, the signals $S_0$, $S_1$ and $S_2$ are not necessarily in phase with one another if $f_c$ is unequal to $Nf_s$ (N is a positive integer); that is, in order for the equalizer to properly operate, the signals of other taps ($S_0$ and $S_2$) should be in the phase range of $-90°$ to $+90°$ on a vector plane with the reference phase of signal $S_1$. This relationship is diagrammed in FIG. 6, where if the signal $S_0$ and $S_2$ are in either the first or the fourth quadrants (for instance, vectors 2 or 1), the control system will properly operate; if they are in either the second or the third quadrants (for instance, vector 3 or 4), the control will diverge. As above described, problem can be readily solved by utilizing the present invention in a number of different ways.

Where the modulation rate ($f_s$) is such that the signals $S_0$ and $S_2$ are in the second and third quadrant, the signal polarity of one of the circuits in the control loop can be reversed, such that the phase of $S_0$ and $S_2$ are brought into the first and fourth quadrants.

Another way in which the present invention can eliminate the aforementioned problem is by making the delay times ($\tau_1$, $\tau_2$) of the delay circuits 10 and 11 unequal to the inverse of the modulation rate, such that the phases of the signals $S_0$ and $S_2$ eventually come into the first and fourth quadrants. In this case, the closer the phases of the signals $S_0$ and $S_2$ are to that of $S_1$, the more stable the control loop is with respect to any change (offset) in the carrier ($f_c$). If the shifts of the delay times $\tau_1$ and $\tau_2$ are small enough, they will not affect the equalizing capacity of the equalizer.

The third method, of maintaining the phases of the signals $S_0$ and $S_2$ in the first and fourth quadrants is a combination of the first two methods. The phases of the signals $S_0$ and $S_2$ are brought as close as possible to the inverse polarity of the signal $S_1$ by shifting the delay times $\tau_1$ and $\tau_2$, as well as reversing the polarity of one of the circuits in the control loop.

By resorting to these methods, and by processing in the baseband, an equalizer with an IF band transversal filter using the ZF algorithm as in the present invention, can be utilized.

The decision/error signal generator circuit 42 shown in FIG. 3 will now be described in greater detail. Generally, as illustrated in FIG. 4, in the case where L=16, $7(=\sqrt{L}-1)$ DC-coupled decision circuits (whose threshold values are $l_1$ through $l_7$ and whose outputs are $x_1$ through $x_7$, respectively) are provided which produce error signals Y. In this case, $Y_P = Y'_P$ and $Y_Q = Y'_Q$ as in FIG. 1, and if $Y = x_1 + x_2x_3 + x_4x_5 + x_6x_7$, error signals Y as listed in Table 1 will result.

TABLE 1

| $X_1$ | $X_2$ | $X_3$ | $X_4$ | $X_5$ | $X_6$ | $X_7$ | Y |
|---|---|---|---|---|---|---|---|
| 1 | 1 | 1 | 1 | 1 | 1 | 1 | 1 |
| 0 | 1 | 1 | 1 | 1 | 1 | 1 | 0 |
| 0 | 0 | 1 | 1 | 1 | 1 | 1 | 1 |
| 0 | 0 | 0 | 1 | 1 | 1 | 1 | 0 |
| 0 | 0 | 0 | 0 | 1 | 1 | 1 | 1 |
| 0 | 0 | 0 | 0 | 0 | 1 | 1 | 0 |
| 0 | 0 | 0 | 0 | 0 | 0 | 1 | 1 |
| 0 | 0 | 0 | 0 | 0 | 0 | 0 | 0 |

FIGS. 5(A) and (B) refer to an instance in which full-wave rectification is used to reduce the required number of decision circuits. The number of decision circuits in this particular case is reduced to four. If, the thresholds of the DC-coupled decision circuits are represented by $L_1$ through $L_4$ and their outputs by $X_1$ through $X_4$, $Y = Y_1 \oplus X_2 \oplus X_3 \oplus X_4$, and error signals Y listed in Table 2 will result. In this case, $Y_P = Y'_P$ and $Y_Q = Y'_Q$, and the main and other taps need only one error signal each.

In the circuit illustrated in FIG. 3, the inputs of decision circuits 214, 224 and 213, 223 having thresholds of $L_2$ and $L_4$, respectively, are AC-coupled to full-wave rectifiers 210 and 220 by capacitors 215 and 225. In this instance, two error signals $Y'_P$ and $Y'_Q$ are required for controlling the main tap; and $Y_P$ and $Y_Q$, for controlling each of other taps.

TABLE 2

| $X_1$ | $X_2$ | $X_3$ | $X_4$ | Y |
|---|---|---|---|---|
| 1 | 1 | 1 | 1 | 1 |
| 1 | 0 | 1 | 1 | 0 |
| 1 | 0 | 0 | 1 | 1 |
| 1 | 0 | 0 | 0 | 0 |
| 0 | 0 | 0 | 0 | 1 |
| 0 | 0 | 0 | 1 | 0 |
| 0 | 0 | 1 | 1 | 1 |
| 0 | 1 | 1 | 1 | 0 |

The reason for this is that while the function of the variable tap gain circuit 20 for the main tap is to keep the multi-level baseband signal level constant, that of other variable tap gain circuits 21, 22, 31 and 32 to eliminate inter-symbol interference. In the case of AC-coupling, there is a difference between the error signal generation of level variation and that of inter-symbol interference. This is represented by $X'_4$ and $X'_4$ in Table 3,

TABLE 3

| $X_1$ | $X_2'$ | $X_3'$ | $X_4'$ | $X_4'$ | Y | Y' |
|---|---|---|---|---|---|---|
| 1 | 1 | 1 | 1 | 1 | 1 | 0 |
| 1 | 0 | 1 | 1 | 1 | 0 | 1 |
| 1 | 0 | 0 | 0 | 1 | 1 | 1 |
| 1 | 0 | 0 | 1 | 0 | 0 | 0 |
| 0 | 0 | 0 | 1 | 0 | 1 | 0 |
| 0 | 0 | 0 | 0 | 1 | 0 | 0 |
| 0 | 0 | 1 | 1 | 1 | 1 | 1 |
| 0 | 1 | 1 | 1 | 1 | 0 | 1 | where the resulting error signals can be respectifully expressed as:

Error signal for the main tap: $Y' = X'_1 \oplus X'_2 \oplus X'_4$

Error signal for other taps: $Y = X'_1 \oplus X'_2 \oplus X'_3 \oplus X'_4$

Although $X'_4$ and $X'_4$ are expressed to indicate a functional difference, they actually are the output $X'_4$ of the same decision circuit. The different expressions mean that, in the region of 3 to 6 as shown in FIG. 4, the function of the output $X'_4$ in level variation is different from that in inter-symbol interference. Here, use of AC-coupled discriminators contributes to simplifying the circuitry as far as reducing the number of components required, the overall scale of circuitry and the power consumption.

In FIG. 3, the decision circuit consists of decision circuits 211, 212, 221 and 222, the full-wave rectifiers 210 and 220 and EORs 232 and 241, whereby demodulated signals P, P', Q and Q' are produced. For further details on this decision circuit, reference is made to FIG. 5 of the U.S. Pat. No. 4,095,187. Reference numbers 231 and 242 represent EOR circuits, and 233, 234, 243 and 244, exclusive NOR circuits.

In summary, the present invention provides an adoptive equalizer for quadrature amplitude modulated radio waves in which a ZF algorithm is utilized to reduce inter-symbol interference by using a transversal filter in the IF band. An error detector is provided which varies the tap coefficients and the time delays according to the detected distortion. An asynchronism detection means is further provided in which the equalizing function of the present invention is enhanced for periods during which the level of inter-symbol interference is greater than what the variable tap coefficient circuits can normally overcome. These functions are achieved while using relatively simplified circuitry (as opposed to the equalizers of the prior art), which reduces overall power consumption and enhances efficiency.

What is claimed is:

1. An adaptive equalizer system having a control loop comprising; first means for equalizing a modulated carrier wave in response to a first control signal; second means including analogue integrator means for generating said first control signal from the output of said first means, said analogue integrator means forming a self-feedback loop in response to a second control signal and setting said first control signal at a fixed level; and third means for detecting asynchronization in said control loop and providing said second control signal.

2. The adaptive equalizer system of claim 1, wherein said first means comprises a transversal filter including a delay circuit, a main tap and another tap, which operates in the intermediate frequency band.

3. The adaptive equalizer system of claim 2, wherein said transversal filter is controlled by means of zero-forcing equalizing algorithm so that the phase difference in said modulated carrier wave between said main tap and said another tap is in the range of $-90°$ to $+90°$.

4. The adaptive equalizer system of claim 2, wherein the delay time of said delay circuit is neither the inverse of the modulation rate of said modulated carrier wave nor the inverse of twice the modulation rate of said modulated carrier wave.

5. The adaptive equalizer system of claim 1, wherein said second means comprises a decision circuit/error signal generator including a DC coupling decision circuit and an AC coupling decision circuit.

6. The adaptive equalizer system of claim 1, wherein said modulated carrier wave comprises a quadrature amplitude modulated carrier wave.

7. The adaptive equalizer system of claim 1, wherein said self-feedback loop comprises a plurality of logic circuits.

* * * * *

UNITED STATES PATENT AND TRADEMARK OFFICE
CERTIFICATE OF CORRECTION

PATENT NO. : 4,453,256
DATED : June 5, 1984
INVENTOR(S) : Toshihiko RYU

It is certified that error appears in the above-identified patent and that said Letters Patent is hereby corrected as shown below:

Column 1, line 34, insert --)-- after "2,319,807";

Column 2, line 7, "2F" should be --ZF--;

line 16, "2F" should be --ZF--;

line 44, insert --achieves-- before "control";

Column 5, line 18, insert --cannot-- after "equalizer";

line 27, insert --set-- after "to".

Signed and Sealed this

Twenty-third Day of April 1985

[SEAL]

Attest:

DONALD J. QUIGG

Attesting Officer

Acting Commissioner of Patents and Trademarks